United States Patent Office 3,385,262
Patented May 28, 1968

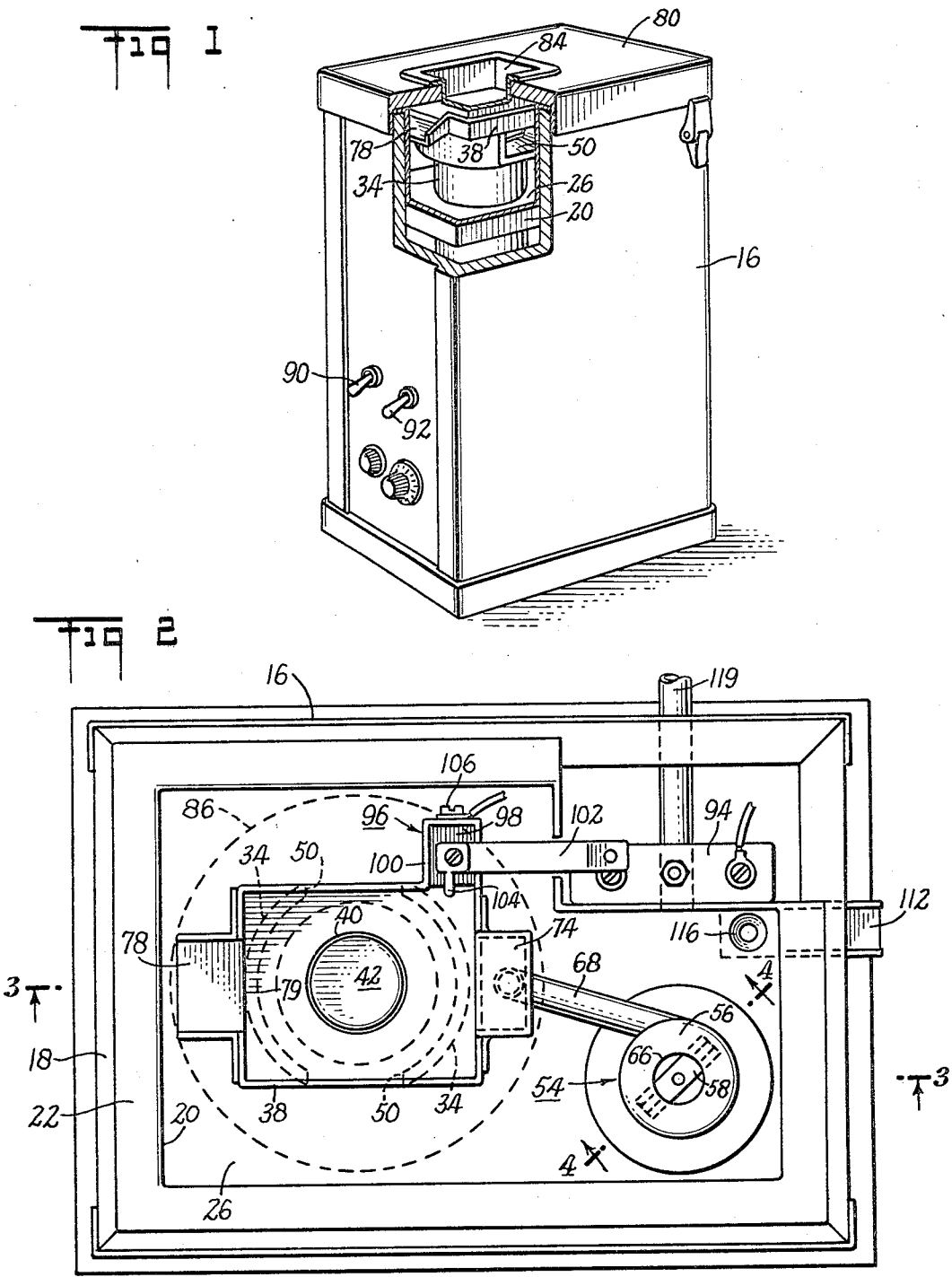

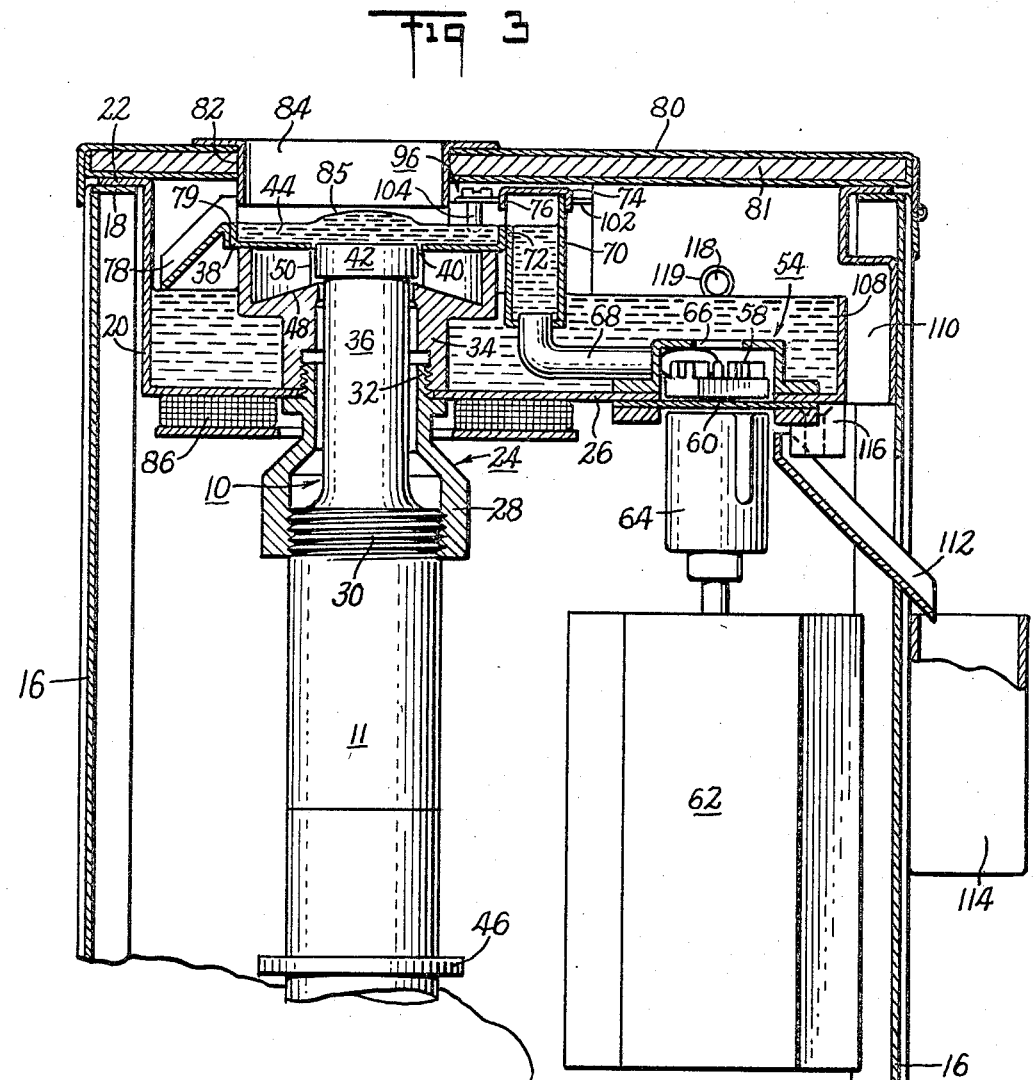
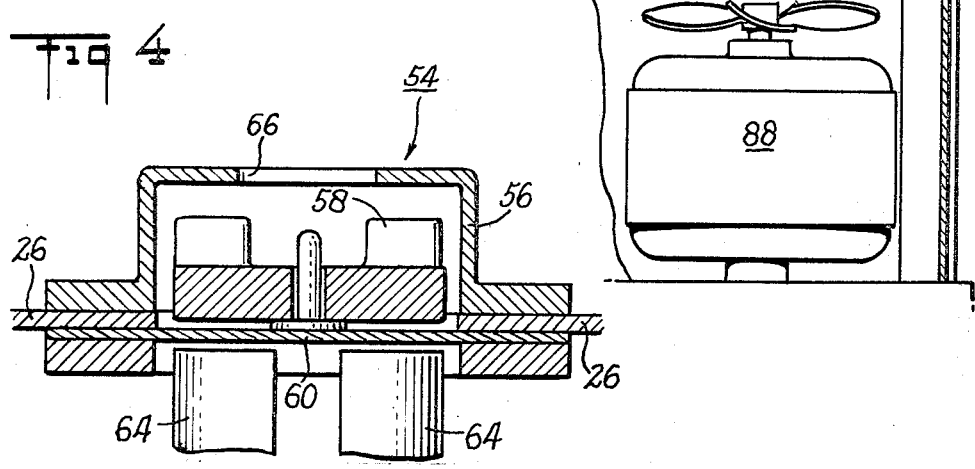

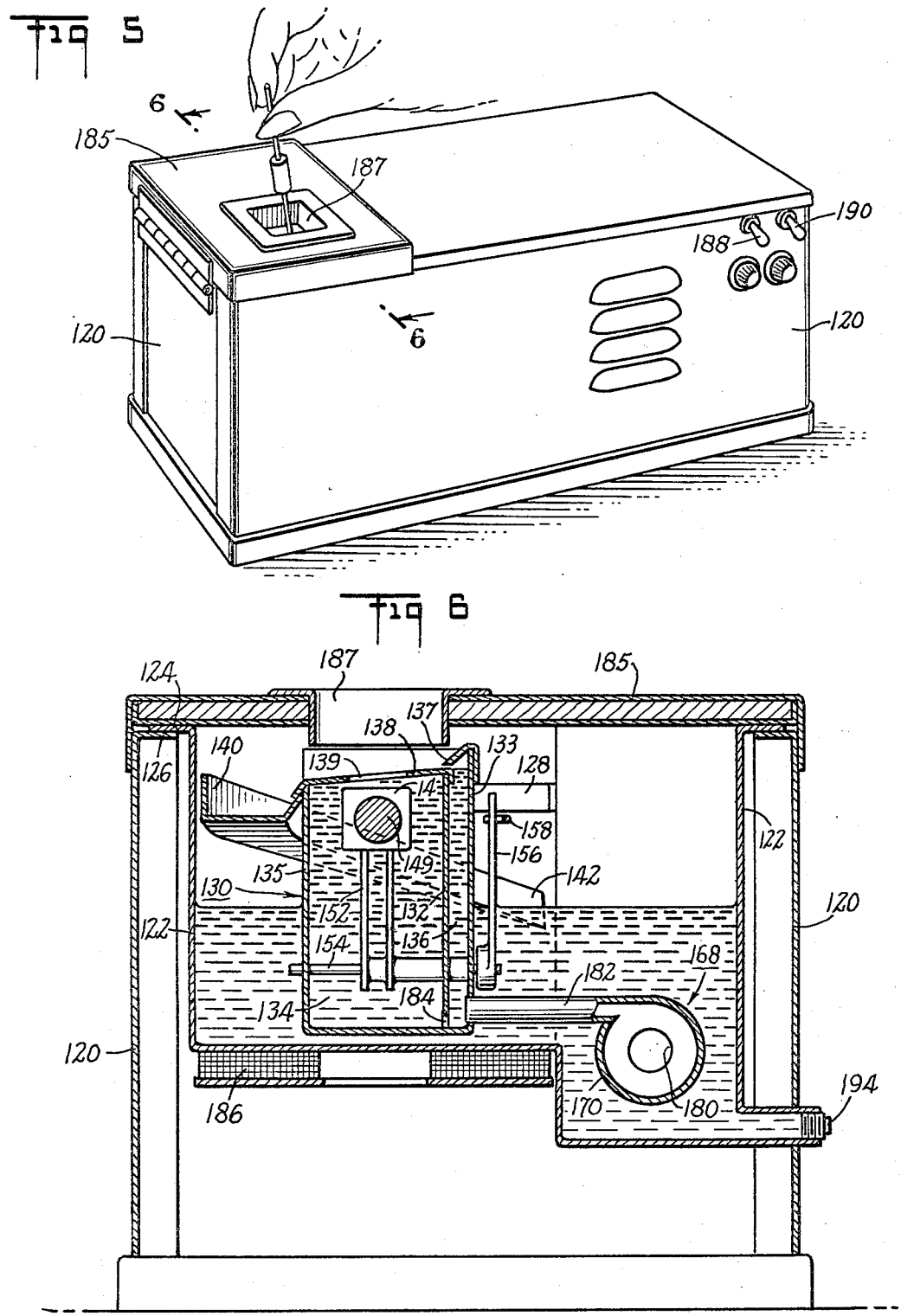

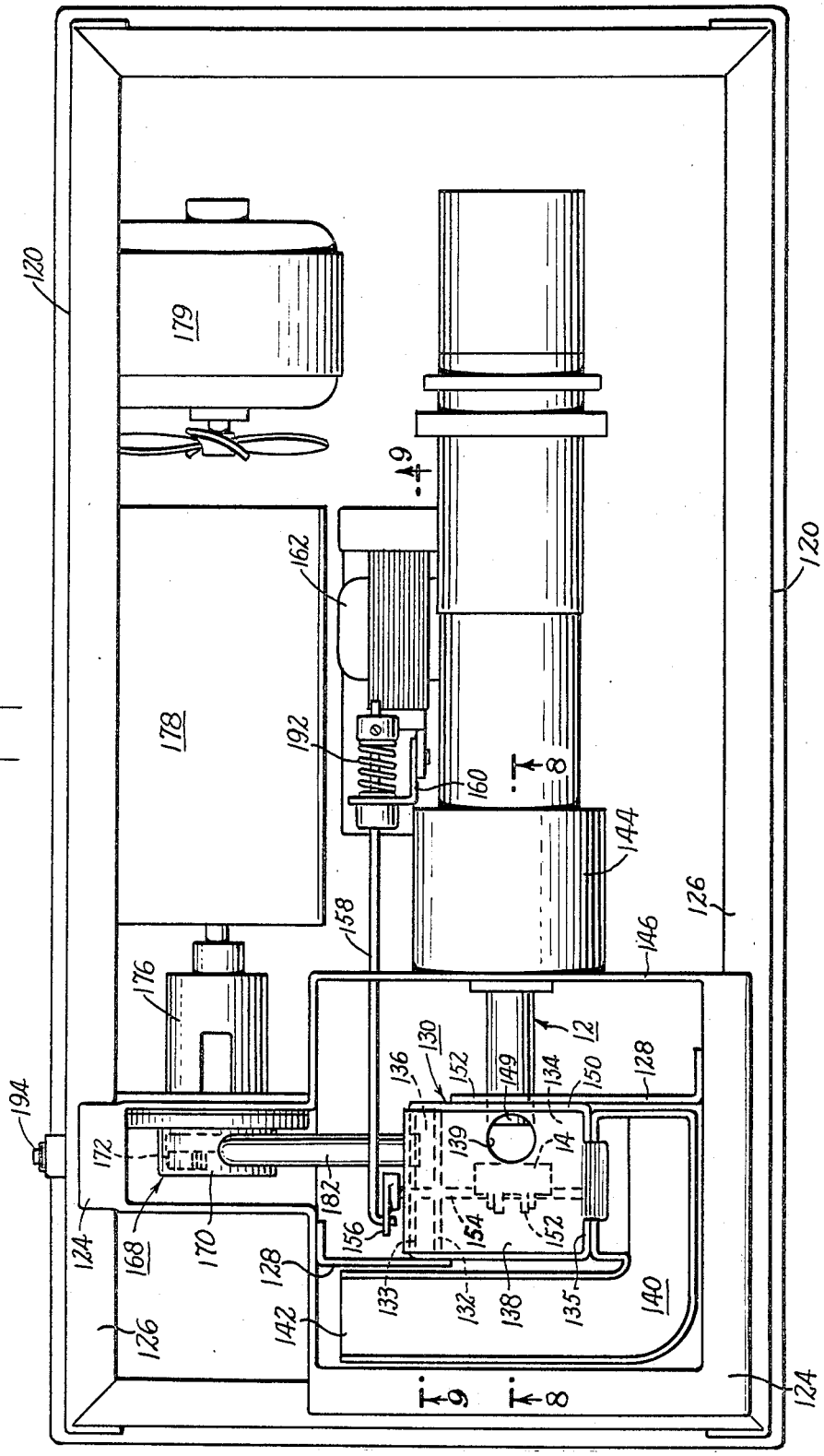

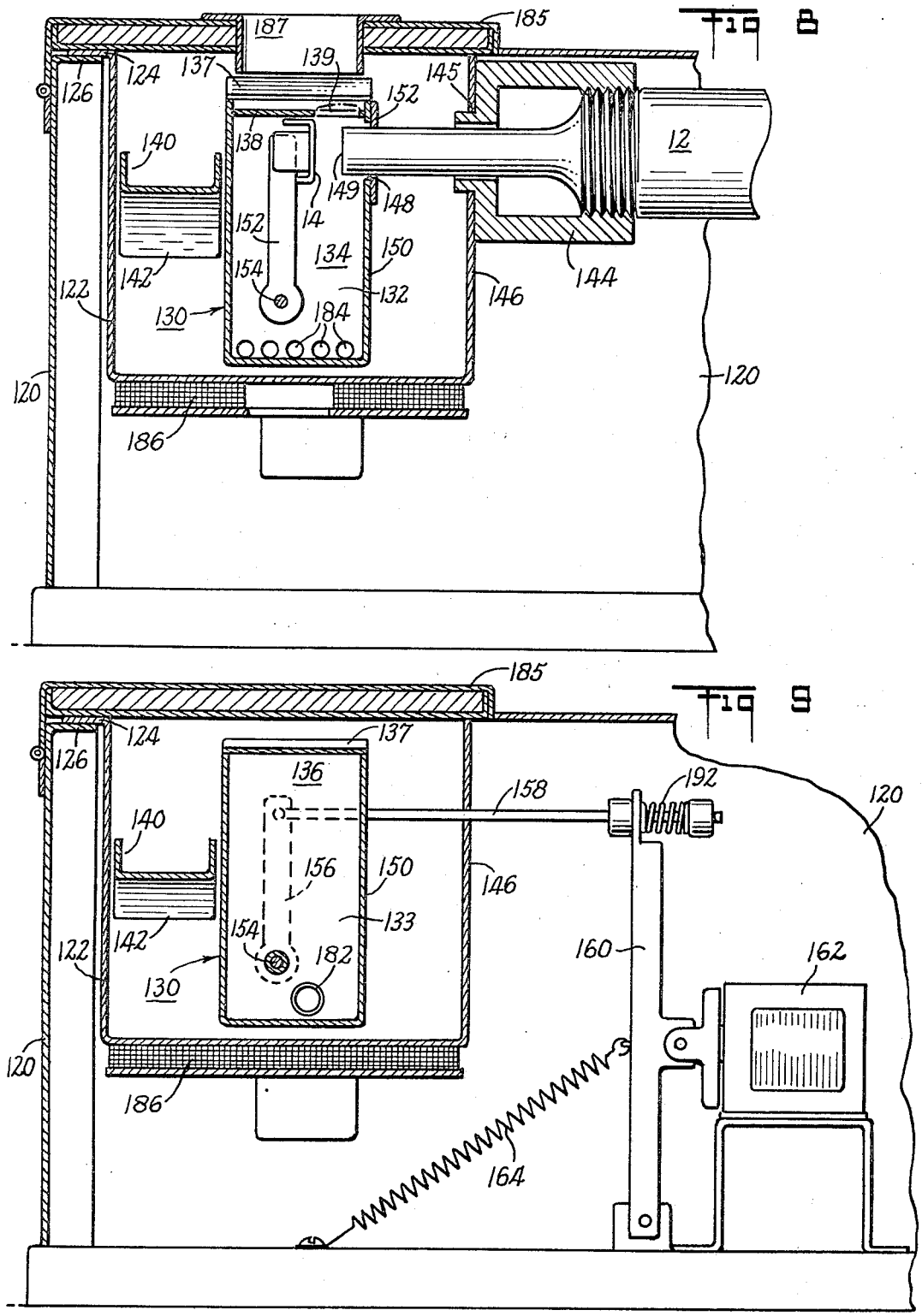

3,385,262
ULTRASONIC SOLDERING OR PLATING
APPARATUS
Stanley E. Jacke and Everett A. Harris, Ridgefield, Conn., and Frank J. Macalus, Ardsley, N.Y., assignors, by mesne assignments, to Branson Instruments, Incorporated, Stamford, Conn., a corporation of Delaware
Filed Sept. 18, 1964, Ser. No. 397,658
13 Claims. (Cl. 118—429)

ABSTRACT OF THE DISCLOSURE

In an ultrasonic soldering or plating apparatus a container holding a quantity of molten metal is provided in its bottom or side with an opening through which an ultrasonic horn extends for causing ultrasonic energy to be imparted to the liquid metal by direct contact therewith. A metal reservoir underlies the container. Molten metal is permitted to leak through a small gap between the opening of the container and the ultrasonic horn, thus providing a leakage path from the container to the underlying reservoir and obviating the need for a tight seal. A pump pumps molten metal from the underlying reservoir to the upper container where such pumped metal is discharged as a surface stream across the level of the molten metal to continuously displace dross. The overflowing excess metal from the container is returned to the reservoir for recirculation by the pump.

This invention relates to sonics and particularly to a method and apparatus for plating. More particularly it relates to a method and apparatus for sonic tinning and ultrasonic solder pots.

In ultrasonic solder pots a supply of molten solder held in a pot or other suitable container is subjected to ultrasonic energy to cause the solder to be agitated to the extent that cavitation develops within the solder. The constant forming and imploding of the microscopic cavitation bubbles within the solder serves to abrasively remove, with a scrubbing action, any coating or oxide layer on a metal article immersed in the solder. Nascent metal on the article is thus exposed to the solder and the article is thereby effectively and uniformly wetted or tinned with the solder. In prior art solder pots, the ultrasonic energy has typically been introduced into the molten solder by coupling an ultrasonic transducer to an exterior surface of the pot to vibrate the pot, and thereby, indirectly, vibrate the solder within the pot. Such sonic activation of molten metal has also been utilized in other tinning and plating applications.

While these prior art pots have been satisfactory in some applications, it has been difficult to couple a sufficient amount of energy into the solder since much of the energy from the transducer is absorbed by the diverse vibrations set up in the pot itself so that only a fraction of the energy available at the transducer is transmitted into the solder.

Attempts have been made to overcome this problem by inserting a high intensity ultrasonic energy source in the form of a concentrating horn directly into the molten solder through the open top of the pot. Although this method has resulted in improved coupling of the energy into the solder, it has proven unsatisfactory in that an objectionable dross, primarily in the form of a lead oxide, develops over the surface of the solder, particularly around the horn-solder-air interface. Consequently, when articles such as electrical leads are inserted into the pot for tinning, they are dirtied by the accumulated surface dross.

Attempts have also been made to pass the tip of the concentrating horn of an ultrasonic transducer through a wall of a solder pot at a location beneath the surface of the solder. Although this method achieves improved coupling of the energy into the solder, it is unsatisfactory since the seal employed between the pot wall and the horn limits the freedom of vibrational movement of the horn. Further, such seals rupture after relatively short periods of usage because of the intensity and frequency of the vibration to which they are subjected by virtue of their direct connection to the horn. The seals rupture first hermetically, that is, air first passes from the exterior of the pot into the pot where it reacts with the solder around the horn tip to form a dross primarily constituted of a lead oxide. The vibratory movement of the horn apparently has a catalytic effect on this reaction so that the quantity of dross formed is substantial. The dross floats to the solder surface where it dirties leads or other articles inserted into the pot.

After further deterioration of the seals due to the continuing vibration, solder begins to flow out of the pot around the horn, necessitating replacement of the seals. This may occur after as few as thirty hours of use.

The prior art solder pots have also proven unsatisfactory in that the oxides and other surface contaminants removed from the leads or other articles inserted into the pot pollute the solder and it must be replaced after a relatively short period of use. Further, the monomolecular oxide layer that is always present on the surface of molten solder when exposed to the atmosphere is ruptured upon insertion of an article for tinning and forms islands of oxide which remain as flotsam on the solder surface. Another monomolecular oxide layer immediately forms on the nascent solder, thus exposed, thereby contaminating the solder surface.

Accordingly, it is an object of the present invention to provide a method and apparatus for sonic tinning and plating that overcomes the above-noted shortcomings and disadvantages of the prior art.

It is a more specific object to provide an ultrasonic solder pot and a method of sonic tinning and plating wherein a greater volume and intensity of cavitation, and hence a greater cleaning action, is achieved than in the prior art.

It is a further object to provide a sonic solder pot and a method and apparatus for sonic tinning and plating having the above-described improved cavitation and cleaning characteristics and yet maintaining a clean molten metal surface.

A still further object is to provide, in a sonic tinning and plating pot having an ultrasonic horn passed through a wall of the pot at a location beneath the surface of the molten metal, an improved arrangement whereby the freedom of vibratory movement of the horn is not impeded and the problem of seal failure is eliminated.

Another object is to provide a sonic tinning and plating pot which will function effectively over sustained periods of continuous operation.

It is a more specific object to provide a sonic solder pot and a method of sonic tinning and plating whereby the molten metal in the pot is maintained in a clean condition over sustained periods of continuous operation.

It is yet another object to provide in a sonic tinning and plating pot means whereby the formation of an oxide film on the surface of the molten metal is precluded or at least impeded.

A still further object of the invention is to provide a method and apparatus of the above character wherein violent cavitation occurs in a concentrated volume of molten metal.

A further object of the invention is to provide a method and apparatus of the above character wherein the most violent cavitation occurs at the surface of articles immersed in the molten metal for tinning or plating.

Still another object of the invention is to provide in a method and apparatus of the above character a clean surface on the molten metal as an entrance for articles to be tinned or plated.

Yet another object of the invention is to provide a method and apparatus of the above character wherein the production of a large amount of dross and the introduction of a large amount of impurities in the molten metal does not impede the utilization of the method and apparatus for an extended period of time before the need arises for cleaning or replacing the molten metal.

The invention accordingly comprises the several steps and the relation of one or more of such steps with respect to each of the others, and the apparatus embodying features of construction, combinations of elements and arrangement of parts which are adapted to effect such step, all as exemplified in the following detailed disclosure, and the scope of the invention will be indicated in the claims.

For a fuller understanding of the nature and objects of the invention, reference should be had to the following detailed description taken in connection with the accompanying drawings in which:

FIGURE 1 is a perspective view of one form of solder pot according to the present invention with the solder pot partially cut away to show details of its internal construction, FIGURE 2 is a top view, with the cover removed, of the solder pot of FIGURE 1;

FIGURE 3 is a cross-sectional view taken along the line 3—3 of FIGURE 2;

FIGURE 4 is a fragmentary cross-sectional view taken along the line 4—4 of FIGURE 2;

FIGURE 5 is a perspective view of a lead tinner according to the present invention;

FIGURE 6 is a cross-sectional view taken along the line 6—6 of FIGURE 5;

FIGURE 7 is a top view, with the cover removed, of the lead tinner of FIGURE 5;

FIGURE 8 is a cross-sectional view taken along the line 8—8 of FIGURE 7; and

FIGURE 9 is a cross-sectional view taken along the line 9—9 of FIGURE 7.

The method of the present invention broadly comprises establishing, in a moving stream of molten metal, a concentrated volume of violent cavitation; providing an entrance surface adjacent to the cavitating volume having no more contaminants than a single monomolecular layer of lead oxide; and providing a large reservoir of molten metal to store contaminants introduced into the solder during the tinning and plating. The large reservoir permits the same volume of molten metal to be used for an extended period of time, since large total amounts of contaminants may be introduced during tinning or plating without exceeding predetermined maximum permissible limits.

The method provides the concentrated cavitating volume in the molten metal stream by introducing the tip of the concentrating horn of a sonic energy source through a wall of the channel or vessel containing the stream. The molten metal is continuously allowed to leak out of the channel or vessel around the horn and is then returned to the reservoir.

The entrance surface is kept clean by the moving molten metal just beneath the monomolecular oxide surface—any oxide islands being immediately swept away. The monomolecular oxide layer may be eliminated by exposing the entrance surface to an inert gas such as nitrogen.

It will be understood by those skilled in the art that sonic energy, as used herein, refers to high power vibrational energy in the audible and super audible range. While the sonic energy sources disclosed herein operate at frequencies from approximately 10 to 50 kilocycles per second, the invention is in no way limited to any particular frequency.

The apparatus of the present invention, broadly considered, comprises a container for holding a quantity of solder. The container is open at its top to allow the insertion into the solder of an article to be tinned. The concentrating horn of an ultrasonic transducer projects at its tip through an opening provided in the container at a location below the surface of the solder. The fit between the horn tip and the container at the opening is such as to permit leakage or tearing of solder out of the container around the horn. The leakage solder is collected in a reservoir underlying the container. A pump, immersed in the solder in this reservoir, operates to continuously return solder from the reservoir to the container to continuously replenish the solder supply in the container in compensation for the solder leakage. The rate at which the solder is returned to the container exceeds that at which the solder is leaking out so that solder flows through the container in a continuous stream. This stream continuously carries away the oxide and other surface contaminants removed from the leads or other articles inserted into the container for tinning.

The preferred apparatus of the present invention takes two forms—the ultrasonic solder pot of FIGURES 1 through 4 and the ultrasonic electrical lead tinner of FIGURES 5 through 9.

In the solder pot of FIGURES 1 through 4, the ultrasonic horn, shown generally at 10, is vertically disposed and projects at its tip or upper end into the solder 44 in the container 38 through an opening 40 in the bottom of the container 38.

In the electrical lead tinner of FIGURES 5 through 9, the ultrasonic horn, shown generally at 12, is horizontally disposed and projects at its tip into the solder in the container 130 through an opening in a side wall of the container 130. A clamp shown generally at 14 is movable within the pot between a rest position spaced from the tip of the horn and a working position against the tip of the horn where it coacts with that tip to hold an article to be tinned against the horn to intensify the scrubbing action to which the article is subjected.

In detail, the solder pot of FIGURES 1 through 4 includes a cabinet 16 provided at its upper periphery with a continuous inwardly directed flange 18 (FIGURE 2). An outer solder pot 20, having a peripheral outwardly directed flange 22, is supported at flange 22 by cabinet flange 18 (FIGURE 3). A harness indicated generally at 24 in FIGURE 3 is threaded upwardly into a threaded bore provided in the bottom wall 26 of pot 20. A lower portion 28 of the harness 24 is internally threaded for coaction with external threads 30 on the horn 10 of an ultrasonic energy source generally indicated at 11. The horn 10 is thus supported in a vertical position by the harness 24. The source 11 may, for example, be of the type disclosed in the copending United States patent application of Stanley E. Jacke et al. entitled Sonis Disperser, Ser. No. 125,568, filed July 20, 1961, now U.S. Patent No. 3,328,610 issued June 27, 1967.

The harness 24, when screwed upwardly to its full extent into the bottom of the pot 20, presents a nipple 32 above the bottom 26 onto which is screwed a collector 34. The collector 34 has a central bore through which passes a reduced diameter portion 36 of the horn 10.

At its upper peripheral edge, the collector member 34 supports an inner solder pot 38. Inner pot 38 has a central bottom aperture 40 through which the tip 42 of the horn projects. Pot 38 is adapted to hold a quantity of molten solder 44.

Upon energization of the horn 10, as by completion of an electrical circuit to terminals 46 of the sonic energy source 11, the tip of the horn will be caused to undergo vertical vibratory movement. The frequency of this vibratory movement is determined by the construction of the source 11. A frequency of 20,000 cycles per second has been effectively used. The tip of the horn is thus caused to move up and down in the molten solder at a predetermined frequency, the amplitude of movement at 20,000 cycles per second being, for example, in the order of a few thousandths of an inch. On the rarefraction side of the cycle, the horn tip is moving away from the solder and the rapid drop in pressure accompanying this movement causes thousands of cavities or voids to form in the solder. These voids collapse like minute claps of thunder with subsequent energy release having localized pressures estimated to be in the range of hundreds of atmospheres. It is this energy release which explodes surface contaminants or oxides from the articles inserted for tinning into the molten solder and allows the solder to uniformly wet the nascent surface of the article.

The horn 10 is supported by the harness 24 at a nodal point; that is, at a portion of the horn which undergoes substantially no vertical movement during energization of the transducer. The supported horn portion does, however, undergo maximum radial expansion and contraction and for this reason the harness 24 is preferably formed of a resilient material so that it may readily yield radially to accommodate the radial expansion of the horn at the point of threaded engagement of the horn and harness.

No seal, as such, is provided between the horn tip 42 and the bottom of the pot 38 so that molten solder continuously oozes or tears out of the container by gravity flow around the horn tip. The horn tip and bottom of the container 38 thus together constitute a tear joint. The continued discharge of solder at this joint prevents air or other gas from entering the pot 38 through the joint, thereby eliminating the dross formation problem encountered upon hermetic rupture of the seals employed in certain prior art solder pots.

The molten solder continuously flowing out of the container 38 around the horn tip drops onto a conical surface 48 presented by the collector 34. The upper edge of the conical surface 48 lies under the horn tip 42, which is of a relatively large diameter as compared with reduced diameter horn portion 36 so that tears of solder dropping down from the side face of the tip 42 are caught by the conical surface 48. The tears dropping onto the surface 48 thereafter gravitate down that surface and are discharged from the collector 34 through diametrically opposed openings 50 (FIGURE 1) provided in that member.

The solder discharging from the member 34 drops into the outer pot 20 where it collects to form a reservoir of solder 52. In order to continuously replenish the supply of solder in the pot 38 in compensation for the continuous solder leakage, means including a pump 54 are provided.

The pump 54 includes a housing 56 bolted to the bottom plate 26 of the pot 20 around an aperture formed in that plate, and an impeller 58 rotatably mounted within the housing. The impeller 58 is carried on a plate 60 clamped to the under surface of the bottom plate 26 and spanning the pump aperture in that plate. A motor 62 is supported within the cabinet 16 and a permanent horseshoe magnet 64 is supported on the free end of the output shaft of motor 64 in a position directly underlying the plate 60. The impeller 58 is formed of a suitable magnetic material, such, for example, as cast iron, and the plate 60 is thin and formed of a suitable non-magnetic material such as stainless steel so that upon energization of motor 62 and rotation of magnet 64, the impeller 58 will be continuously rotated. The pump 54 is thus powered without aid of a direct shaft coupling and the problem of solder leakage at the packing surrounding the shaft at the point where it would otherwise pass through the wall of outer pot 20 is thus avoided.

The solder in the reservoir 52 enters the pump 54 through a port 66 in the upper wall of the pump housing 56 and is continuously discharged from the pump through a conduit 68. Conduit 68 extends tangentially away from the pump housing and thereafter bends upwardly for communication at its upper end with an opening provided in the bottom end of a vertically extending rectangular casing or stack 70 secured to one side wall of the inner pot 38.

The left wall of the casing 70, as seen in FIGURE 3, is of a lesser vertical extent than its other three walls. The casing 70 is secured to the container 38 in a position such that the upper edge of its foreshortened left wall is substantially flush with the upper edge of a reduced height portion 72 of inner pot 38. The other walls of the casing 70 extend approximately to the height of the main body portion of the container 38.

A cap 74, having a depending gate flange 76, is received over the upper end of the casing 70 with a frictional sliding fit. The cap 74 is thus adjustable vertically relative to the casing 70 to vary the height of the lower edge of the gate flange 76 above the upper edge of the reduced height pot portion 72 and thereby vary the height of the solder inlet opening provided therebetween.

A spillway 78 extends downwardly from the container 38. The spillway 78 at its upper end is flush with the upper edge of sill 79 formed as a reduced height portion of a side wall of pot 38. Sill 79 is diametrically opposed to, and is substantially the same height as, reduced height portion 72. Spillway 78 communicates at its lower end with the solder reservoir 52.

The cabinet 16 is provided with a hinged cover 80. The cover 80 is provided with a substantially square access opening 82 in which a tubular member 84 is removably received. The member 84 is supported by engagement of its peripheral flange with the upper surface of the cover 80. Cover 80 is suitably heat insulated as by asbestos 81.

In operation, motor 62 is continuously energized. Solder continuously drips out of the pot 38 through the tear joint provided at the juncture of the horn tip and the bottom plate of the inner pot 38. This discharge solder is collected on the conical surface 48 and is gravitationally discharged from that surface into the reservoir 52. Solder in the reservoir continuously enters the pump housing 56 through the inlet port 66 and is pushed by the pump upwardly through the conduit 68 into the casing 70. The solder rises in the casing 70 under the pump pressure until it reaches the height of the foreshortened left hand wall of that casing, whereupon it spills into the pot 38 over the weir formed by the container wall portion 72.

The rate at which solder is supplied by the pump to the pot 38 is greater than the rate at which the solder is dripping out of the container 38 around the horn tip so that a continuous discharge of solder occurs over sill 79, down spillway 78, and into solder reservoir 52. The molten solder thus flows over and past the tip of the horn in a continuous stream, the solder entering through the casing 70 and being discharged around the horn tip 42 and down the spillway 78. The continuous movement of the solder across the pot 38 from casing 70 to spillway 78 insures that any dross that tends to form on the surface of the solder in the pot, as well as the contaminants removed from the inserted articles by the scrubbing action of the solder, will be immediately and continuously removed, thereby preventing dirtying of leads or other articles inserted into the solder through the access opening 82 for tinning. The contaminants and dross thus removed from the tinning zone are carried off in the continuous solder stream down the spillway 78 to the solder reservoir 52 where they tend to settle out so as not to be recirculated by the pump. Since the apparatus is thus effectively self purging, it may be operated continuously for sustained periods. It has been found, for example, that the solder pot may be used continuously for a complete working day, without necessity to shut down to replace the solder.

An electrical heater 86 of annular form is clamped to the under surface of the bottom plate 26 around the harness 24. Heater 86 is continuously energized during operation of the solder pot to maintain the solder in a molten state. In order to impede the transmission of heat from the molten solder through the horn to the transducer 11, the horn 10 is preferably formed of a poor conductor of heat and a good conductor of energy, such as titanium. The other metallic portions of the solder pot, except for the cabinet, are preferably formed of stainless steel.

A motor driven fan 88 is also provided within the cabinet 16 at a location adjacent the motor 62, to cool the latter.

The control circuitry for the solder pot includes a switch 90 (FIGURE 1) which when thrown completes a circuit to the heater 86, and a switch 92 which when thrown completes a circuit to the motor 62. The switch 92 is also in circuit with a generator, not shown, energizing the horn. In order to prevent damage to the horn or other parts of the solder pot which might occur if the horn were energized with residual solid solder in the apparatus, as might occur for example upon starting up the apparatus following an extended shutdown, a thermoswitch 94 (FIGURE 2) is secured to the outer surface of a vertical wall of outer pot 20 so as to sense the temperature of the solder in the reservoir 52. The switch 94 is in series with switch 92 and closes upon attainment of a predetermined solder temperature.

Further, and in order to prevent personal injury to the operator of the solder pot or splattering of the apparatus which might occur if the horn were energized with only a thin layer of solder in the inner pot, a depth switch generally indicated at 96 in FIGURE 2 is provided in the generator circuit in series with switches 92 and 94. Switch 96 includes an insulator block 98 received in a vestibule section 100 of pot 38, a conductor bar 102 secured at one end to block 98 and at its other end to a terminal of thermo-switch 94, and an L shaped contact 104 extending laterally from bar 102 and then downwardly into pot 38 (FIGURE 3).

The switch 96 will not close until the solder level reaches the lower end of contact 104, an electrical path then being completed from terminal 106, through the walls of pot section 100, through the solder in the pot to contact 104, and through bar 102 to thermo-switch 94. Since the switches 92, 94, and 96 in the generator circuit are in series, it is apparent that the horn cannot be energized until switch 92 is thrown and until the solder has reached a predetermined safe temperature and depth. The circuit to the generator also includes a foot-switch (not shown) in series with switches 92, 94, and 96, whereby the horn may be selectively and intermittently energized without shutting down the pump motor 62.

The right hand wall, as seen in FIGURE 3, of the outer pot 20 is cut away to provide a discharge weir 108 over which flows molten solder in the reservoir in excess of the depth determined by the height of weir 108. The overflow solder falls downwardly through a chute 110 onto an inclined chute 112 by which it is conducted into a suitable overflow container 114 removably secured to cabinet 16. A drain plug 116 is also provided in the bottom wall 26 of outer pot 20, removal of plug 116 allowing the molten solder to drain onto chute 112 and thence into container 114.

A port 118 provided at a suitable location in a side wall of pot 20 at a height above the level of the solder in the reservoir allows nitrogen or other inert gas to be introduced, as by a pipe 119, into the closed area overlying the solder reservoir so as to preclude or at least impede the formation of the oxide layer on the reservoir surface as well as on the surface of the solder in the inner pot 38.

In the operation of the ultrasonic solder pot of FIGURES 1 through 4, an electrical lead or other article to be tinned is inserted downwardly through the tubular member 84 and its tip pushed into firm contact with the tip 42 of the horn 10. The transducer 11 is then energized. The article is thus positioned squarely within the portion of the solder undergoing the most violent cavitation; that is, the solder volume immediately overlying the horn tip 42. The extent of the cavitation occurring in this solder volume is evidenced by the convex hump 85 (FIGURE 3) formed on the surface of the solder directly overlying the horn tip.

The extent of the cavitating action to which the lead is subjected is also increased because of the fact that the lead, being pressed directly against the horn tip, tends to vibrate with the horn tip. The lead thus in effect forms an extension of the horn so that the article itself cavitates the solder directly adjacent its surface rather than relying solely on the horn tip to perform the cavitating function. Surface contaminants are thus scrubbed or exploded from the lead by the violent cavitation of the solder to expose a nascent surface on the lead so that the solder may completely and uniformly tin the lead.

The surface contaminants thus removed are continuously carried off in the solder stream that flows continuously from the stack 70, through the pot 38 and down the spillway 78 to the solder reservoir. If no inert gas is supplied to the solder pot, the continuous solder stream moves just below the monomolecular oxide layer that is continuously present on the solder surface. If inert gas is used to preclude the formation of the surface monomolecular layer, the continuous solder stream includes the solder surface. The surface contaminants thus introduced into the solder reservoir tend to settle out so as not to be recirculated by the pump. The solder flowing through the pot 38 thus remains relatively clean over sustained periods of usage so as to provide a relatively clean entrance surface over the horn to prevent dirtying of the articles inserted for tinning.

Solder also flows continuously out of pot 38 around horn tip 42 thereby eliminating a physical seal and avoiding the many problems attendant upon the use of such a seal.

The electrical lead tinner of FIGURES 5-9 includes a cabinet 120 which is horizontally elongated to accommodate the horizontally disposed horn 12, which again is preferably formed of titanium. Referring to FIGURE 6, an outer pot or container 122 is supported within the cabinet by engagement of its peripheral flange portion 124 with an inwardly directed peripheral flange 126 on the cabinet 120. Supported centrally within the outer pot 122, as by brackets 128 (FIGURE 7) secured to the inner wall of outer pot 122, is an inner pot or container 130. The inner pot 130 includes a vertical partition 132 extending completely across the pot to divide it into a main body portion 134 and an inlet or riser portion 136. The height of the partition 132 is somewhat less than that of the right hand wall 133 of the inner port 130, and somewhat greater than that of the left hand wall 135 of the inner pot.

A flat plate 138 having an aperture 139 is supported at its opposite ends on the upper surface of partition 132 and the upper surface of the left hand pot wall 135, respectively, and slopes downwardly from the partition 132 by virtue of the greater height of that partition than wall 135. A chute 140 is secured to pot wall 135, the chute beginning at a point directly underlying the lower end of plate 138 and extending downwardly from that point around the periphery of the pot 130 to its discharge end 142.

Now referring to FIGURE 8, a resilient harness 144 threadably received in an aperture 145 in a side wall 146 of outer pot 122 threadably receives the horn 12 at a nodal point on the latter. The horn 12 passes, within the harness 144, through aperture 145 and thence at its tip 149 through an aperture 148 provided in side wall 150 of inner pot 130. A plate 152 secured to wall 150 at the aperture 148 surrounds the horn tip as the latter passes through wall 150 into the interior of inner pot 130.

The intensifier clamp 14 (FIGURES 7 and 8) is received within the inner pot 130 and is movable between its aforedescribed rest and working positions by means of a lever system including a crank arm 152, shaft 154 passing through partition 132 and wall 133 of the inner pot, crank arm 156, rod 158 and lever 160 (FIGURE 9).

A solenoid 162 has its plunger connected to lever 160 and when energized, as by depression of a foot switch (not shown) pivots the lever 160 clockwise, as viewed in FIGURE 9, against the resistance of return spring 164. The clamp 14 is thus moved by the aforedescribed linkage system from its rest to its working position to clamp against the tip of the horn 12. The clamp is returned to its rest position by the return spring 164 upon de-energization of solenoid 162.

A sump 166 formed as a downwardly directed extension of outer pot 122 houses a pump indicated generally at 168. The pump 168 is of the same general construction and is driven in the same general manner as the pump 54 of the FIGURES 1–4 embodiment. It includes a housing 170 and an impeller 172 (not shown) rotatably mounted on a non-magnetic plate (not shown) and driven by a permanent horseshoe magnet 176 secured to the free end of the output shaft of a motor 178 supported within the cabinet. A motor driven fan 179 supported within cabinet 120 cools motor 178.

An inlet port 180 is provided in the pump housing 170 and an outlet conduit 182 extends tangentially from housing 170 to the lower end of inlet or riser portion 136 of inner pot 130. A plurality of holes 184 (FIGURES 6 and 8) provided in partition 132 adjacent its lower end provides liquid communication between inlet or riser portion 136 and main body portion 134. An electrical heater 186 is clamped to the under surface of outer pot 122.

The cabinet 120 includes a hinged heat insulated lid 185 having a rectangular access opening receiving a tubular member 187 directly overlying inner port 130.

A switch 188 (FIGURE 5) is provided on the cabinet 120 and when closed completes a circuit to heater 186; another switch 190 when closed completes circuits to the pump motor 178 and to a generator, not shown, energizing the horn 12.

In operation, the switch 188 is closed to complete the circuit to heater 186, whereby to heat the solder contained within the outer pot 122 and render it molten. Switch 190 is thereafter closed to energize the pump motor 178. Molten solder enter pump 168 through inlet port 180 and is pushed by the pump through conduit 182 to inlet or riser portion 136 of inner pot 130. The solder rises in inlet portion 136 until it reaches the upper end of plate 138, whereupon it flows downwardly across plate 138 for discharge into the chute 140. The rate of flow of solder from riser section 136 onto plate 138 is variably restricted by a throttling member 137. Member 137 is secured to the upper end of wall 133 and has a gate flange overlying the plate 138 to form a flow restricting slit therebetween.

Solder also passes from riser portion 136 through holes 184 in partition 132 and rises upwardly within the main body portion 134 of pot 130, flowing continuously upwardly past the horn tip 149 and being thereafter discharged onto plate 138 through aperture 139.

When a condition of continuous flow of solder across plate 138 from inlet portion 136 and of continuous upward discharge of solder from portion 134 through aperture 139 is attained, an article—for example the electrical lead shown in FIGURE 5—maye be inserted downwardly through the tubualr member 187 and through aperture 139 to dispose the lower end of the lead opposite the horn tip 149.

Solenoid 162 and the horn transducer 12 are then actuated by depression of a common control treadle to move the clamp 14 into its working position and thereby clamp the lead against the horn tip. After a period of time varying with the compositon of the article to be tinned, but typically in the order of a fraction of a second, the lead is scrubbed clean and tinned. The treadle controlling the clamp solenoid and the transducer is then released to release the lead which is thereafter removed from the solder pot and, if desired, another lead inserted into the solder pot to be tinned in the same manner.

The clamp 14, by holding the lead or other article to be tinned directly against the horn tip, enables the article to vibrate with the tip. The article thus effectively forms an extension of the horn so that the article itself cavitates the solder directly adjacent its surface rather than relying solely on the horn tip to perform the cavitating function. The clamp thus has the effect of intensifying the cavitation of the solder immediately adjacent the article to be tinned, thereby intensifying the scrubbing action to which the article is subjected so that even stubborn and or/thick oxide layers may be quickly removed.

The oxide layers and other contaminants thus removed from the articles are caught up in the continuous stream of solder flowing upwardly past the horn tip from the holes 184 for discharge through aperture 139. These contaminants are thus carried off in the solder stream away from the timing zone and through aperture 139 to the solder reservoir where they tend to settle out so as not to be recirculated by the pump. The solder continuously streaming across plate 138 from riser portion 136 tends to sweep the plate 138 clean and thereby aid in the continuous removal and transport of contaminants to the reservoir. The solder streaming across plate 138 also acts to sweep away the islands of oxide cumulatively formed adjacent the apertures 139 upon piercing of the monomolecular oxide layer on the solder surface by successive leads.

A spring 192 in the clamp operating linkage limits to a few ounces the pressure exerted by the clamp, thereby preventing clamp from affecting the delicately balanced acoustical properties of the horn. The spring 192 also constitutes in effect a lost motion linkage enabling the clamp to firmly clamp leads or other articles of widely varying diameters.

During the course of operation, and as in the embodiment of FIGURES 1–4, solder continuously oozes out of the inner pot 130 in tear fashion through the tear joint provided between the horn tip 149 and the plate 152, the leakage solder thereafter dropping by gravity into the solder reservoir in the outer pot 146 for recirculation, in the manner previously described, by the pump 168.

A drain plug 194 in sum 166 allows the solder to be drained when desired and a port, not shown, may be provided at a suitable location in outer pot 122 to allow the introduction of an inert gas to prevent formation of an oxide on the solder surface. The metallic portions of the solder pot, with the exception of the horn and cabinet, are preferably formed of stainless steel.

It will be seen that each of the disclosed embodiments effectively achieves the objects set forth above. Since in each embodiment the tip of the horn is moving back and forth in direct contact with the molten solder in the pot, the cavitation, and therefore the cleaning characteristics, of the solder in the pot are greatly improved over known solder pots of the type wherein the solder is vibrated only indirectly by vibration of the pot. It will further be seen that in both embodiments the horn passes through the wall of the pot without a seal. Since there is no seal, there is nothing to impede the freedom of vibratory movement of the horn, and the problem of seal failure is completely eliminated. It will further be seen that, in both embodiments, by virtue of the continuous solder flow into and out of the pot, the dross and removed surface contaminants tending to form on the solder surface are continuously removed so that leads or other articles inserted into the solder in the pot will not be dirtied and so that the pot will function effectively over the sustained periods of continuous operation.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

For example, whereas the above descriptions have been limited to the use of solder for tinning purposes, it will be obvious that plating operations involving other metals may be effectively and advantageously carried out by the use of methods and apparatus embodying principles of the present invention.

It is also to be understood that the following claims are intended to cover all of the generic and specific features of the invention herein described, and all statements of the scope of the invention, which, as a matter of language, might be said to fall therebetween.

We claim:

1. A plating apparatus comprising, in combination:
(A) a container for holding a quantity of molten metal having
   (a) a first opening at its top for insertion of an article to be plated into the metal and,
   (b) a second opening at a location below the level of said metal therein;
(B) an ultrasonic horn projecting at its tip through said second opening with a fit permitting continuous leakage of said metal out of said container around said horn;
(C) a reservoir underlying said container for collecting the metal leaking out of said container around said horn; and,
(D) means, including a pump arranged to draw metal from said reservoir and feed it to said container, for continuously replenishing the supply of metal in said container in compensation for said leakage.

2. A plating apparatus comprising:
a container for holding a quantity of molten metal, said container having a first opening at its top for insertion of an article to be plated into the metal and a second opening at a location below the level of said metal therein;
an ultrasonic horn projecting at its tip through said second opening with a fit permitting continuous leakage of said metal out of said container around said horn;
a metal reservoir underlying said container and disposed to receive metal leaked along said horn out of said container;
a pump position to draw metal from said reservoir;
conduit means connecting said pump to said container;
and means continuously driving said pump at a speed to feed fresh metal into said container at a rate exceeding the rate of the aforesaid leakage of metal out of said container, whereby metal is continuously discharged from said container at its top for return, along with said leakage metal, to said reservoir.

3. In an ultrasonic soldering apparatus including molten metal recirculating means, the combination of:
an inner container for holding therein a quantity of molten metal and having a first opening at its top for insertion of an article to be plated with the metal and a second opening at a location below the level of said metal therein;
an outer container, at least partially surrounding said inner container, serving as a receptacle for receiving overflowing metal from said inner container and having an opening substantially coaxially aligned with said second opening of said inner container;
a horn adapted to resonate at an ultrasonic frequency projecting through said opening of said outer container and said second opening of said inner container, the frontal surface of said horn being disposed below the molten metal level confined in said inner container for imparting, when resonating, ultrasonic energy to the molten metal in said inner container;
means for engaging said horn substantially at a nodal zone thereof and fastening it in liquid-tight relation to said outer container at said opening;
said second opening of said inner container being slightly larger than the outside dimension of said horn projecting therethrough whereby to provide a tear joint for molten metal leaking along said horn from said inner container to said outer container;
overflow means for conducting molten metal from said inner to said outer container;
a pump coupled for receiving molten metal from a point below the molten metal level in said outer container and pumping the received metal to said inner container, and
a conduit coupled with its lower end to the discharge side of said pump for receiving molten metal collected in said outer container and provided near its upper end with a discharge opening for discharging such metal into said inner container, whereby excess molten metal discharged from said discharge opening of said conduit after overflowing said first container is conducted by said overflow means from said inner container to said outer container.

4. In an utrasonic soldering apparatus as set forth in claim 3, said pump and discharge opening dimensioned and arranged for providing a steady stream of molten metal to overflow the surface of the metal in said inner container.

5. In an ultrasonic soldering apparatus as set forth in claim 3, said second opening of said inner container and said opening of said outer container being disposed substantially in a horizontal plane for causing said horn to be projecting through said openings along a substantially vertical axis.

6. In an ultrasonic soldering apparatus as set forth in claim 3, said second opening of said inner container and said opening of said outer container being disposed substantially in a vertical plane for causing said horn to be projecting through said openings along a substantially horizontal axis.

7. In an ultrasonic soldering apparatus as set forth in claim 3 and means for providing an inert gas atmosphere above the level of the molten metal disposed in said inner container.

8. In an ultrasonic soldering apparatus as set forth in claim 3 and clamping means disposed for urging an article immersed in the molten metal through said first opening into contact with the frontal surface of said horn.

9. In an ultrasonic soldering apparatus as set forth in claim 8, said clamping means being selectively movable to and from a position adjacent said horn.

10. In an ultrasonic soldering apparatus as set forth in claim 3, said conduit being disposed substantially vertically for causing molten metal to rise therein, and the discharge opening of said conduit being disposed at a height substantially flush with the rim of said inner container for providing a surface stream of molten metal to flow across said inner container and reach said overflow means.

11. In an ultrasonic soldering apparatus as set forth in claim 3 and a drain plug disposed on said outer container for draining molten metal.

12. In an ultrasonic apparatus as set forth in claim 3, said pump comprising:
a rotatable impeller formed of a magnetic material immersed in the molten metal in said outer container, and
a motor having a magnet on its output shaft;
said magnet disposed where it is separated from said impeller only by a wall of said outer container, whereby said impeller is rotated upon rotation of said motor.

13. A plating apparatus comprising in combination:
a container for holding a quantity of molten metal and having a first opening at its top for insertion of an article to be plated into the metal, and a second opening in its bottom wall;

an ultrasonic horn projecting with its tip through said second opening;

said horn at the location of said second opening being dimensioned to form with said second opening a substantially narrow gap for permitting leakage of said metal out of said container around said horn into an underlying reservoir, and being provided further with a relatively large diameter portion extending downwardly away from said tip and bottom wall, followed at a location below said bottom wall of said container by a relatively smaller diameter portion;

a collector member surrounding said smaller diameter horn portion and presenting a conical surface concentric with said smaller diameter portion and extending from a location below said large portion downwardly for communication at its lower rim with said reservoir, whereby said conical surface is adapted to conduct molten metal leaking through said gap and falling upon said conical surface to said reservoir, and pumping means disposed for taking metal from said reservoir and discharging it into said container for replenishing the supply of metal in said container and compensating for the leakage through said gap.

References Cited
UNITED STATES PATENTS

| | | |
|---|---|---|
| 2,635,388 | 4/1953 | Peyches et al. |
| 2,824,543 | 2/1958 | Brown _____ 118—429 X |
| 2,926,622 | 3/1960 | Petermann _____ 118—429 X |
| 2,997,979 | 8/1961 | Tassara _____ 118—49 |
| 3,277,566 | 10/1966 | Christensen _____ 228—37 X |

CHARLES A. WILLMUTH, *Primary Examiner.*

J. P. McINTOSH, *Assistant Examiner.*